Nov. 14, 1950     P. DANIELSSON     2,529,920
MEANS FOR DRESSING FISH Filed Dec. 27, 1946     6 Sheets-Sheet 2

Inventor
Paul Danielsson
by Sommers & Young
Attorneys Nov. 14, 1950  P. DANIELSSON  2,529,920
MEANS FOR DRESSING FISH
Filed Dec. 27, 1946  6 Sheets-Sheet 5

Patented Nov. 14, 1950

2,529,920

UNITED STATES PATENT OFFICE 2,529,920

MEANS FOR DRESSING FISH

Paul Danielsson, Stora Essingen, Sweden, assignor to Arenco Aktiebolag, Stockholm, Sweden, a joint-stock company of Sweden Application December 27, 1946, Serial No. 718,686
In Sweden December 29, 1945

19 Claims. (Cl. 17—3)

This invention relates to improvements in the dressing of fish and it is an object of the invention to make provision for the removal of the gills from the fish without damaging exterior parts of the fish and practically without externally visible marks of their treatments. Another object of the invention consists in the provision of a simple and efficient means for the complete severing of the gills without removal of valuable meaty parts from the body and without damaging the gill covers. Still another object of the invention consists in the provision of a means for the removal of the gills and possibly also valueless entrails in a manner enabling the gill cover to close after the treatment and thereby to prevent foreign matters from entering the abdominal cavity and deteriorate the fish.

With these and other objects not specifically mentioned, in view, my invention consists of certain novel features of construction, combination and arrangements of parts, as will be hereinafter described and particularly set forth in the claims hereunto appended.

In the drawings, in which like characters of reference indicate the same or corresponding parts.

Referring to the drawings, the pockets 1 into which the fish are introduced are secured to a pair of conveyor chains 2 which run over two pairs of sprockets 3 and 4. The sprockets 3 are secured to a driving shaft 5 and the sprockets 4 are secured to an idle shaft 6 rotatably journalled in the machine frame 8. At a level below the upper part of fish conveyor consisting of the chains 2 and the pockets 1 is mounted a vertically adjustable rotor 7 provided with two pinchers for the removal of the gills from the fish. Below the rotor 7 is mounted a chute 9 adapted to receive and carry off the gills and possibly also entrails removed from the fish. A guide bar 10 extends below the pockets 1 in the fish-feeding direction and is provided with oblique flutes for guiding the laterally advancing fish and thereby displacing them longitudinally against a gauge bar 11 extending longitudinally of part of the upper portion of the fish conveyor.

Figures 5, 6, 18, 19:
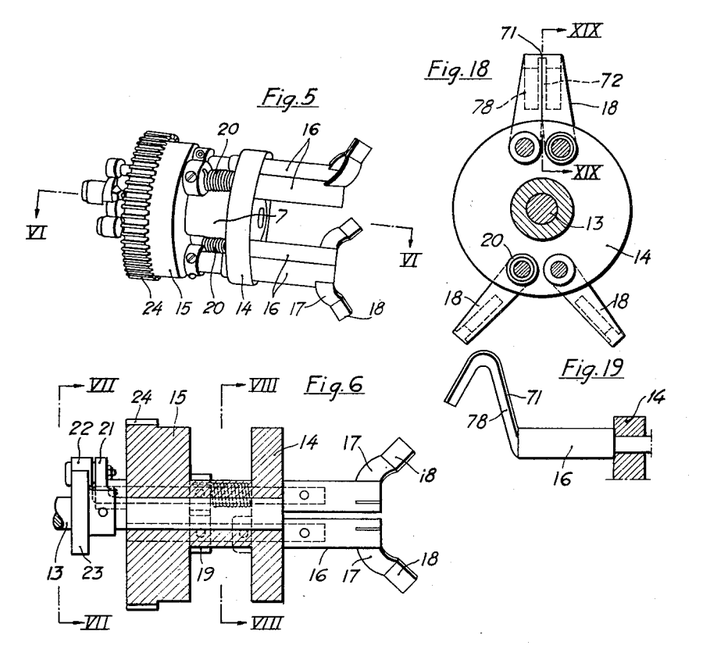
Fig. 5 is a perspective view on an enlarged scale of means for pinching and removing the gills from the fish.
Fig. 6 is a longitudinal sectional view on the line VI—VI of Fig. 5.
Fig. 18 is a cross sectional view of a modification of the means for pinching and removing the gills.
Fig. 19 is a view, partly in section on the line XIX—XIX of Fig. 18.
Figure 7:
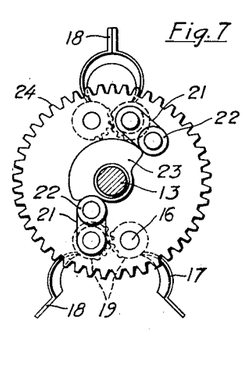
Fig. 7 is an end view, partly in section, on the line VII—VII of Fig. 6.
Figure 8:
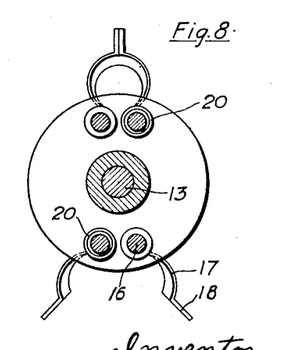
Fig. 8 is a sectional view on the line VIII—VIII of Fig. 6.

As shown in Figs. 5 to 8 the rotor 7 is rotatably journalled on an immovable spindle 13 and provided with two flanges 14 and 15 in which are rotatably journalled two pairs of spindles 16 to the front ends of which are secured curved blade springs 17 each of which being equipped with a straight pincher leg 18. The spindles 16 of each pair are interconnected by toothed segments 19. A coiled spring 20 is arranged around one of the spindles 16 of each pair and tends by means of the toothed segments 19 to turn said spindles so as to swing the pincher legs 18 apart. At their outer, i. e. rear ends beyond the flange 15 laterally extending rocking levers 21 are secured to those spindles 16 which are surrounded by the springs 20. Each lever 21 has a roller 22 which by the spring 20 is pressed against an immovable cam disc 23 secured to the spindle 13. The flange 15 has a toothed rim 24 which meshes with a gear wheel 26 secured to a shaft 25 connected by means of a gear 73 to a driving shaft 44. By this arrangement the pincher legs 18 are against the action of the springs 20 closed when they, on moving in a circular path, are swung upwards towards their uppermost position, as shown in Figs. 5, 7 and 8, and are opened by the springs 20 when they, on continued movement, are swung downwards.

Figures 9, 10, 11, 11A, 12:
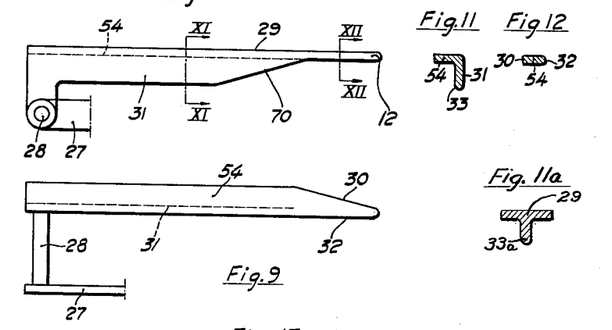
Figs. 9 and 10 are a plan view and an elevational side view, respectively, of a part (the spit) of the machine.
Figs. 11 and 12 are cross sectional views on the lines XI—XI and XII—XII, respectively, of Fig. 10.
Fig. 11a is a cross sectional view corresponding to Fig. 11 but showing another embodiment of the spit.

To the spindle 13 is secured one end of an arm 27 to the other end of which is secured a spindle 28. To the spindle 28 is secured the rear end of a wedge-shaped spit 29 which extends longitudinally of the upper part of the fish conveyor and the free front end of which is directed opposite to the fish-feeding direction. Thus, the spit 29 is together with the rotor 7 adjustable vertically. The spit 29 has at its rear and main portion a ⌐-shaped cross section and its free end is rounded. The oblique edge 30 of the horizontal upper flange 54 as well as the edge 32 of the front portion 12 of the spit are slightly rounded. Also the lower edge 33 of the vertical flange 31 is rounded (Fig. 12). The front portion 12 of the spit 29 consists of a flat plate and the vertical flange 31 tapers at its edge 70 in the direction towards said plate.

Figure 13:
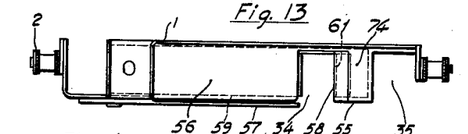
Fig. 13 is a side view of a conveyor pocket.
Figure 14:
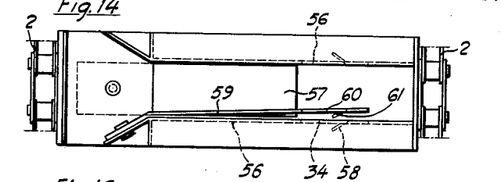
Fig. 14 is a plan view of the conveyor pocket shown in Fig. 13.

The conveyor pockets 1 (Figs. 13 and 14) comprise each two side walls 56 consisting of plates having ⌐-shaped cross section, and a downwardly yielding bottom plate 57. The downwardly directed parts of the side walls have each closely in front of the bottom plate 57 an opening 34 provided with an outwardly bent tongue 58. At the rear end of one of the side walls 56 is secured an outwardly yielding plate 59 which has an opening 60 facing the openings 34, and a tongue 61 similar to the tongues 58. Alternately, a yielding plate 59 can be arranged at each of both the side walls 56 of the pocket 1 or the plates 59 might be omitted if the side walls themselves are adapted to yield in the same manner as the plate 59. In front of the openings 34 the side walls 56 form tongues 74 that extend downwards to the bottom of the pocket. Between the lower edges 55 of the tongues 74 is an opening which forms a direct continuation of the bottom opening at 34.

The gauge bar 11 is adjustable in the front openings 35 of the pocket walls 56 transversely to the fish-feeding direction. For that purpose the bar 11 is secured to two brackets 36 which are mounted each on a screw 37 provided with a sprocket 38. One of the screws 37 has a hand operated head 39 and both the screws are interconnected by a chain 40 running over the sprockets 38. For advancing the pockets 1, i. e. driving the fish conveyor in the direction of the arrow P (Fig. 2), a sprocket 41 is secured to the shaft 5 and driven by a chain 42 and a sprocket 43 secured to the driving shaft 44 in such a manner that each pocket 1 advances continuously through two steps when the rotor 7 turns through one revolution.

Figure 3:
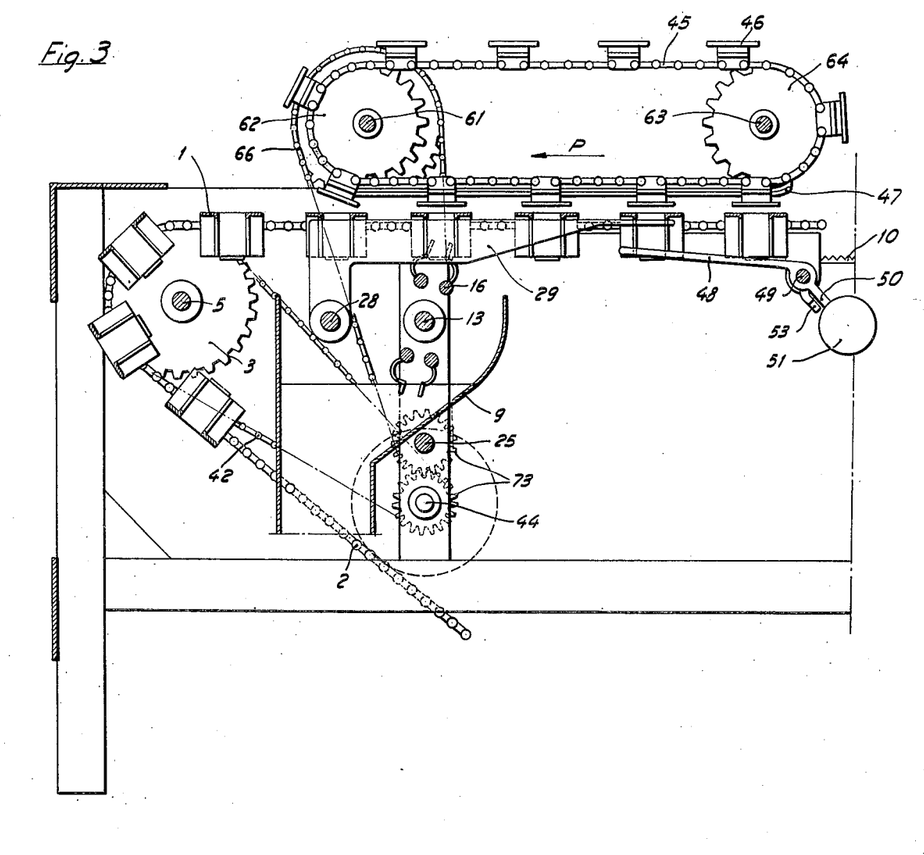
Fig. 3 is a vertical sectional view on the line III—III of Fig. 1.
Figure 4:
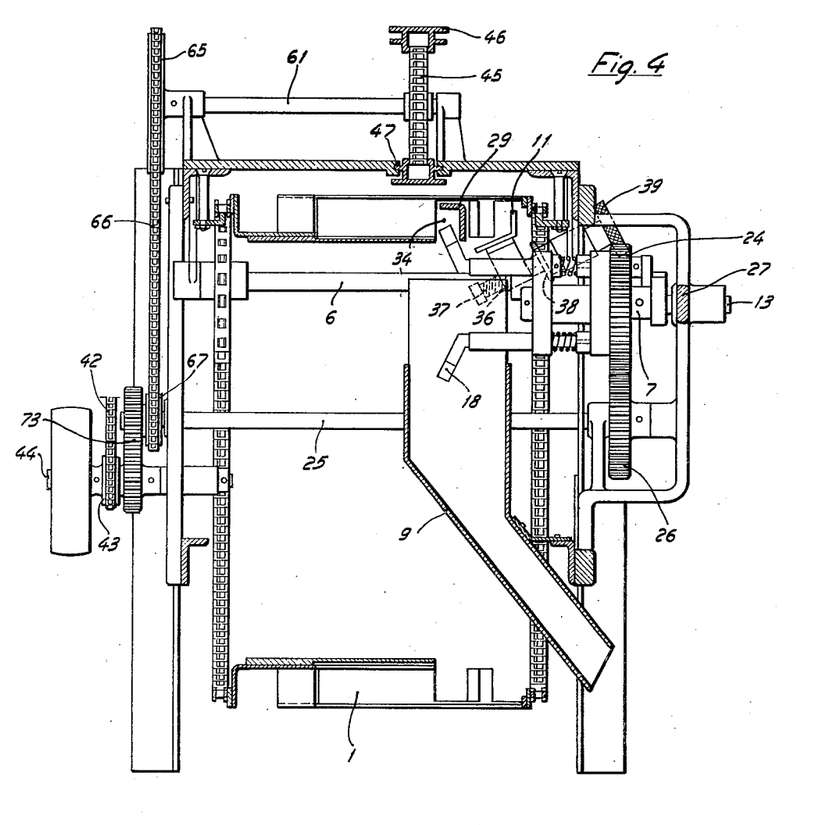
Fig. 4 is a sectional view on the line IV—IV of Fig. 2.

Above the spit 29 is arranged an endless chain 45 carrying press heads or plates 46 movable in the direction of the arrow P (Fig. 3). The plates 46 are adapted to move in rectilinear guides 47 which determine their vertical positions relative to the conveyor pockets 1. The chain 45 is driven by a sprocket 62 secured to a rotatable shaft 61 and runs over another sprocket 64 which is secured to an idle shaft 63. Still another sprocket 65 secured to the shaft 61 is driven by a chain 66 which runs over a sprocket 67 secured to the shaft 25. Below the chain 45 is an adjusting plate 48 turnably mounted on a pin 49 and rigidly connected to an arm 50 which carries a counterweight 51. The counterweight 51 is adapted to swing the plate 48 upwardly in the openings 34 of the conveyor pockets 1. A stationary abutment 53 is adapted to limit this swing by supporting the arm 50.

A fish is introduced into each of the continuously advancing pockets 1 in front of a guard plate 52 so that its belly engages the bottom plate 57. Thereby, the plate 59 yields outwardly on pressing laterally upon the fish whereby the fish is prevented from lateral tilting in the pocket. When the fish is advanced in the direction of the arrow P it slides laterally upon the bar 10 the oblique flutes of which displace the fish longitudinally until their heads engage the gauge bar 11. The fish are then moved over the downwardly yielding plate 48, and thereby they are by said plate urged upwardly in the pockets 1 into engagement with one of the plates 46 just moving above the plate 48. As the distance between the upper edges of the gill openings and the back of the head of the fish is within relatively narrow limits invariable irrespective of the size of the fish the fish will obviously be adjusted into a vertical position enabling the free end of the spit 29 to enter the gill openings closely beneath their upper edges as the fish has also occupied a correct longitudinal position in the pockets 1.

Figures 1, 15:
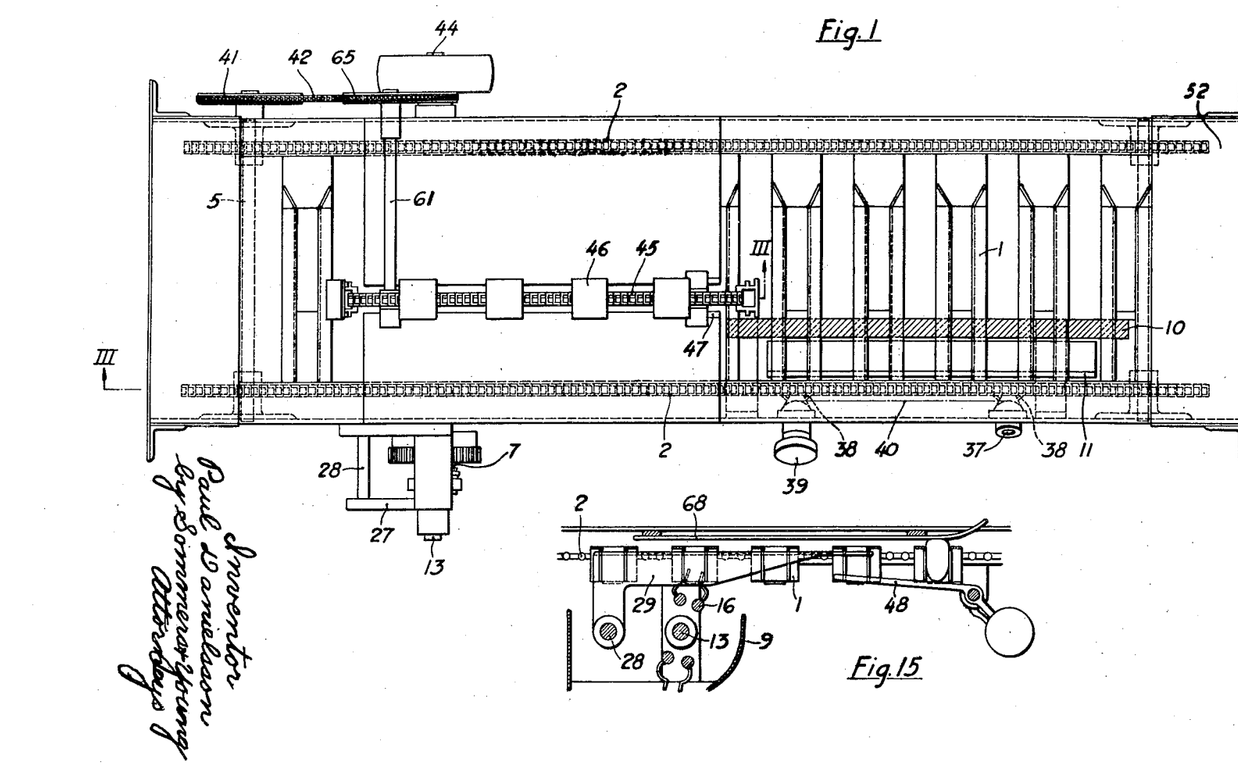
Figs. 1 and 2 are a plan view and an elevational side view, respectively, of a machine embodying the invention.
Fig. 15 shows a modified part of the machine.
Figure 2:
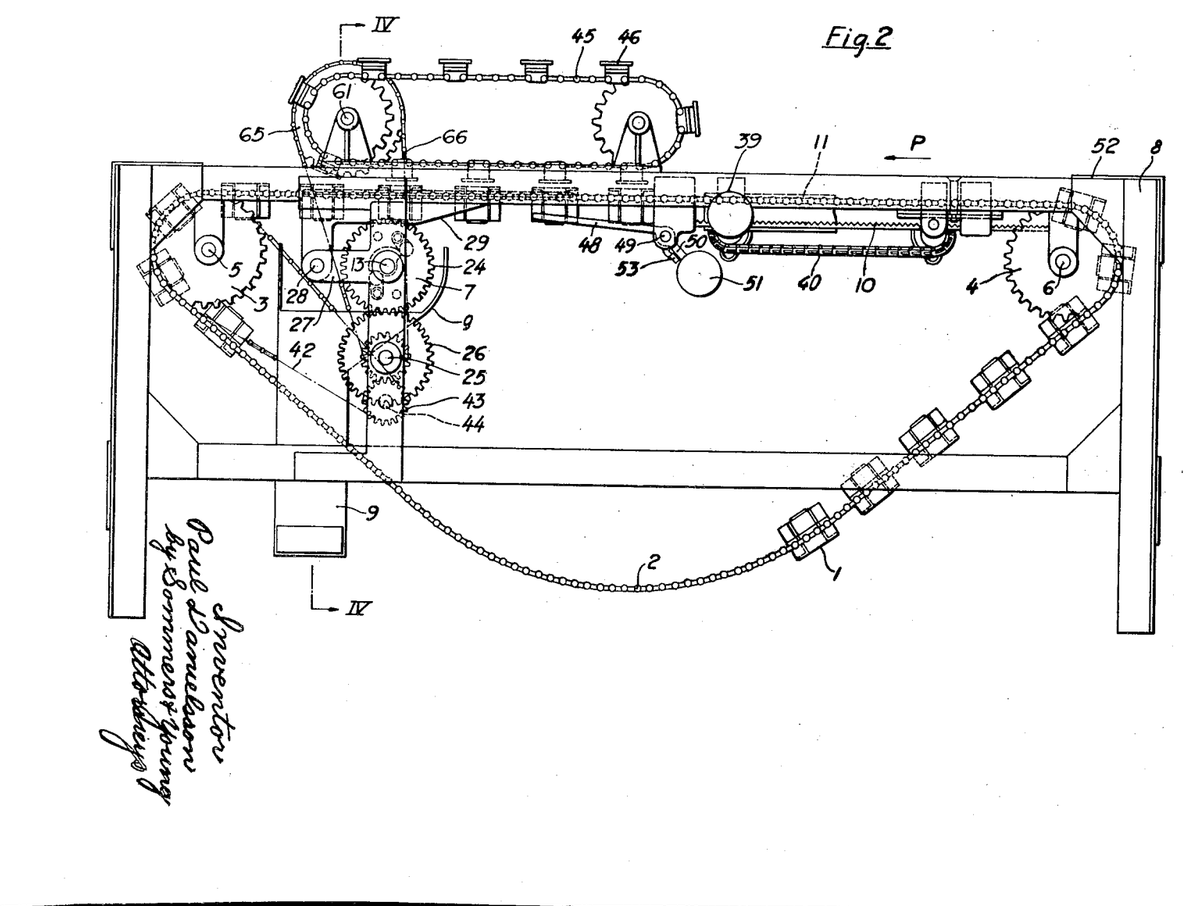
Figure 13A:
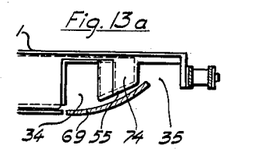
Fig. 13a is a side view illustrating a modified embodiment of parts shown in Fig. 13.

The adjustment of the positions of the fish can, however, also be executed in another manner than that now described, e. g. by urging the fish down into the pockets 1. Thus, as shown in Fig. 15 a vertically adjustable bar 68 may be arranged slightly above the path of the pockets 1. The bar 68 is bent upwardly at its end directed oppositely to the fish-feeding direction. In this embodiment the guide bar 10 is replaced by a bar 69 (shown in Fig. 13a) having a slightly curved cross section and being adapted to support the heads of the fish so that even the backs of the heads of the smallest fish will be positioned slightly above the pockets 1. In this embodiment the tongues 74 are cut off obliquely to enable the pockets to pass the bar 69.

When consecutively advancing over and past the bar 69 and entering below the bar 68 the fish are by the latter automatically forced down into the pockets 1 to occupy correct vertical positions with respect to the backs of their heads and, consequently, also with respect to the upper edges of their gill openings. This downward adjustment can, if desired, be effected against the action of the downwardly yielding plate 48. In this case it is by way of example assumed that the fish are manually adjusted longitudinally (e. g. against the gauge bar 11, when being introduced into the pockets 1. The longitudinal adjustment can, however, also in this case be effected automatically, if desired.

Figure 16:
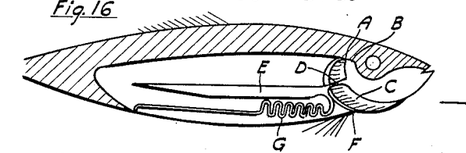
Fig. 16 illustrates diagrammatically a fish before its treatment in the machine.
Figure 17:
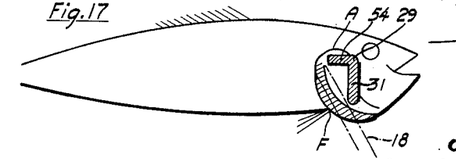
Figs. 17 and 17a illustrate the cooperation between the spit and the means for pinching and removing the gills.

When the fish thus having been adjusted vertically and longitudinally is moved against the spit 29 said spit enters at its rounded free end the gill openings at or closely beneath their upper edges A (Figs. 16 and 17) and behind the connection B between the gill-covers and the coronal bone whereby the gill-covers are bent aside in a direction opposite to the fish-feeding direction. When the front portion 12 of the spit 29 penetrates the gill openings its oblique edge 30 severs the gills C from the upper portions of the body of the fish whereby the veins are torn off. Thereafter, the downwardly directed rounded and oblique edge 70 of the flange 31 of the spit urges the gills and the lower portions of the mouth of the fish downwards (Fig. 17) whilst the head of the fish is supported by the horizontal flange 54 (directed towards the tail end of the fish) so that the portions of the gills below the flange 54 will be accessible to one of the pinchers moving in a circular path. When the pincher legs 18 have seized said portion of the gills as well as the throat of the fish the pincher will on its continued movement pull the gills downwards whereby their thin and gristly connections F with the body of the fish are torn off. Thereby, the gullet D and the stomach E will also be pulled out of the body of the fish. In case the guts G would not be removed by this action other provisions, e. g. the arrangement as described in the Patent No. 2,169,791, may be used for this purpose. Thus, the portions of the gills being present at the other side of the vertical flange 31 of the spit 29 will be pulled out of the pocket 1 through the bottom opening between the edges 55 of the tongues 74. When the fish has passed the spit 29 the gill covers close so that the appearance of the fish will be practically the same as before the eviscerating and foreign matters will be prevented from entering the dressed fish.

Figure 17A:
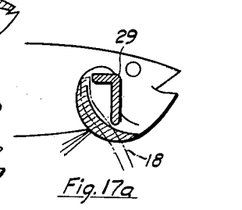

The scope of the invention should not be considered to be restricted to the embodiment and its modifications as described hereinbefore but many other modifications might be made without departing from the spirit of the invention. Thus, the spit 29 may have T-shaped cross section as shown in Fig. 11a. Such a spit is particularly well adapted for cooperation with means operating at both the sides of the vertical web 33a of the spit for the removal of entrails. Thereby the eviscerating means operating in the proximity of the abdominal cavity of the fish, i. e. to the right (Fig. 11a) of the web 33a of the spit may consist of a pincher or scissors for cutting off the gill portions and adjacent parts from other parts of the entrails. Instead of being straight the legs 18 of the pincher or scissors may be very crooked. As shown in Fig. 17a they may, however, alternatively have a slight curvature whereby the curvature of the opposite edges of the pincher legs passing between the side and bottom edges 30 and 33 of the spit 29 may have a curvature adapted to that of the branchial arch of the fish. Instead of using the fluted bar 10 the fish can be adjusted longitudinally by pressure, e. g. as described in the patent application No. 544,204, now Patent No. 2,437,081, issued March 2, 1948. In both cases the conveyor pockets 1 may themselves serve as means for limiting the longitudinal displacement of the fish, e. g. by means of narrowings at their ends adapted to receive the heads of the fish. The pinchers and also the scissors may be adapted to swing about a joint central spindle. Alternatively, they are movable in a non-circular, e. g. rectangular path. Even though it might be preferable to use a stationary spit and to feed the fish laterally against same other embodiments may be possible. The fish can, e. g., be advanced transversely or longitudinally and individually or in groups so that their gill openings are caused to occupy the above-mentioned position opposite to a reciprocated spit which enters the gill openings, whereafter pinchers or the like continue the treatment of the fish in the manner as hereinbefore described. Alternatively, the legs of the pinchers or scissors may themselves be equipped with spits projecting therefrom and performing the same operation as the spit 29 whereby the spits will first enter the gill openings whereafter the pinchers or scissors will act upon the entrails. As shown in Figs. 18 and 19 the very crooked pincher legs 18 may have relatively narrow edges 71 and rear walls 78 so that the entrails will not be suspended to said legs but they will easily drop out of the space between said walls when the pinchers are swung down and opened.

I claim:

1. In a fish dressing machine, a spit having a free end, means associated with said spit for relatively moving the fish and said spit to cause said spit to enter the gill openings of the fish by its free end and to force a portion of the gills out of the fish, gill removing means operatively associated with the spit, and driving means associated with said gill removing means and said spit for relatively moving said gill removing means and said spit to cause said gill removing means to catch the gills near to the spit and at a point behind the free end of the spit and to move said spit and said gill removing means apart to pull the gills out of the fish supported by said spit.

2. In a fish dressing machine, a conveyor for feeding the fish laterally, a spit operatively associated with said conveyor and extending longitudinally of the fish feeding direction and having a free end pointed oppositely to said feeding direction, said fish conveyor being adapted to move the fish against said end of the spit and thread the fish onto said spit by their gill openings, gill removing means operatively associated with said spit, and driving means associated with said gill removing means and the spit to cause said gill removing means to first approach the spit near to the spit at a point behind the free end of the spit to catch portions of the gills forced by said spit out of the fish body and thereafter to recede from the spit on removing the gills from the fish supported by the spit.

3. In a fish dressing machine, a wedge-shaped spit having a free end, means for relatively moving the fish and said spit to cause said spit to enter the gill openings of the fish by its free end and force a portion of the gills out of the fish, gill removing means operatively associated with said spit, and driving means associated with said gill removing means and said spit for relatively moving said gill removing means and said spit to cause said gill removing means to catch the gills near to the spit and at a point behind the free end of the spit and to move said spit and said gill removing means apart to pull the gills out of the fish supported by said spit.

4. In a fish dressing machine, a spit having a free end and two longitudinal flanges forming a ˥-shaped beam, means for relatively moving the fish and said spit to cause said spit to enter the gill openings of the fish by its free end and force a portion of the gills out of the fish, gill removing means operatively associated with said spit, and driving means associated with said gill removing means and said spit for relatively moving said gill removing means and said spit to cause said gill removing means to catch the gills at a point near to the spit and behind the free end of the spit and to move said spit and said gill removing means apart to pull the gills out of the fish supported by said spit.

5. In a fish dressing machine, a spit having a free end and longitudinal flanges forming a ˥-shaped beam, means for relatively moving the fish and said spit to cause said spit to enter the gill openings of the fish by its free end and force a portion of the gills out of the fish, gill removing means operatively associated with said spit, and driving means associated with said gill removing means and said spit for relatively moving said gill removing means and said spit to cause said gill removing means to catch the gills at a point near to the spit and behind the free end of the spit and to move said spit and said gill removing means apart to pull the gills out of the fish supported by said spit.

6. In a fish dressing machine, a spit having a free end and longitudinal flanges forming a profiled beam, means for relatively moving the fish and said spit to cause said spit to enter the gill openings of the fish by its free end and force a portion of the gills out of the fish, gill removing means operatively associated with said spit, and driving means associated with said gill removing means and said spit for relatively moving said gill removing means and said spit to cause said gill removing means to catch the gills at a point near to the spit and behind the free end of the spit and to move said spit and said gill removing means apart to pull the gills out of the fish supported by said spit, one of said flanges extending beyond the other flange and tapering towards the free end of the spit.

7. In a fish dressing machine, a spit having a free end and two longitudinal flanges forming a profiled beam, means for relatively moving the fish and said spit to cause said spit to enter the gill openings of the fish by its free end and to force a portion of the gills out of the fish, gill removing means operatively associated with said spit, and driving means associated with said gill removing means and said spit for relatively moving said gill removing means and said spit to cause said gill removing means to catch the gills at a point near to the spit and behind the free end of the spit and to move said spit and said gill removing means apart to pull the gills out of the fish supported by said spit, said two flanges tapering in a direction towards the free end of the spit, one of said flanges extending beyond the other flange.

8. In a fish dressing machine, a spit having a free end, a pocket adapted to receive the fish, means for relatively moving said pocket and said spit to cause said spit to enter the gill openings of the fish by its free end and force a portion of the gills out of the fish, gill removing means operatively associated with said spit, and driving means associated with said gill removing means and said spit for relatively moving said gill removing means and said spit to cause said gill removing means to catch the gills near to the spit at a point behind the free end of the spit and to move said spit and said gill removing means apart to pull the gills out of the fish supported by said spit, said pocket having two side walls and a bottom which are provided with an opening adapted to receive the spit and the gill removing means, said side walls consisting between said opening and one end of the pocket of flaps having bottom edges located at both sides of a bottom opening forming an extension of said opening for said spit and gill removing means and being adapted to let through parts of the gills and entrails of the fish.

9. In a fish dressing machine, a spit having a free end, a pocket adapted to receive the fish, means for relatively moving said pocket and said spit to cause said spit to enter the gill openings of the fish by its free end and force a portion of the gills out of the fish, gill removing means operatively associated with said spit, and driving means associated with said gill removing means and said spit for relatively moving said gill removing means and said spit to cause said gill removing means to catch the gills near to the spit at a point behind the free end of the spit and to move said spit and said gill removing means apart to pull the gills out of the fish supported by said spit, said pocket being yieldingly self-adjustable to accommodate its width to the thickness of the fish.

10. In a fish dressing machine, a spit having a free end, a pocket adapted to receive the fish, means for relatively moving said pocket and said spit to cause said spit to enter the gill openings of the fish by its free end and force a portion of the gills out of the fish, gill removing means operatively associated with said spit, and driving means associated with said gill removing means and said spit for relatively moving said gill removing means and said spit to cause said gill removing means to catch the gills near to the spit at a point behind the free end of the spit and to move said spit and said gill removing means apart to pull the gills out of the fish supported by said spit, said pocket having a side wall adapted to yield laterally to accommodate the width of the pocket to various sizes of the fish.

11. In a fish dressing machine, a spit having a free end, a conveyor having a pocket for feeding the fish laterally against said free end of the spit to thread the fish onto said spit by its gill openings, gill removing means operatively associated with said spit, and driving means associated with said gill removing means and said spit for relatively moving said gill removing means and said spit to cause said gill removing means to catch the gills near to the spit at a point behind the free end of the spit and to move said spit and said gill removing means apart to pull the gills out of the fish supported by said spit, said pocket having a rigid side wall and a side wall which is adapted to yield to accommodate the width of the pocket to various thicknesses of the fish, said yielding side wall being located foremost in the fish feeding direction.

12. In a fish dressing machine, a spit having a free end, means for relatively moving the fish and said spit to cause said spit to enter the gill openings of the fish by its free end and force a portion of the gills out of the fish, gill removing means operatively associated with said spit, and driving means associated with said gill removing means and said spit for relatively moving said gill removing means and said spit to cause said gill removing means to catch the gills near to the spit and at a point behind the free end of the spit and to move said spit and said gill removing means apart to pull the gills out of the fish supported by said spit, said gill removing means comprising a pincher provided with pinching legs having a slightly curved portion enabling entrails to be easily released from said legs when the pincher is opened.

13. In a fish dressing machine, a spit having a free end, means for relatively moving the fish and said spit to cause said spit to enter the gill openings of the fish by its free end and force a portion of the gills out of the fish, gill removing means operatively associated with said spit, and driving means associated with said gill removing means and said spit for relatively moving said gill removing means and said spit to cause said gill removing means to catch the gills near to the spit and at a point behind the free end of the spit and to move said spit and said gill removing means apart to pull the gills out of the fish supported by said spit, said gill removing means comprising a pincher provided with pinching legs having a straight portion enabling entrails to be easily released from said legs when the pincher is opened.

14. In a fish dressing machine, a spit having a free end, means for relatively moving the fish and said spit to cause said spit to enter the gill openings of the fish by its free end and force a portion of the gills out of the fish, gill removing means operatively associated with said spit, and driving means associated with said gill removing means and said spit for relatively moving said gill removing means and said spit to cause said gill removing means to catch the gills near to the spit and at a point behind the free end of the spit and to move said spit and said gill removing means apart to pull the gills out of the fish supported by said spit, said gill removing means comprising a pincher provided with pinching legs having a curved portion the curvature of which is adapted to the curvature of the branchial arches of the fish.

15. In a fish dressing machine, a spit having a free end, means for relatively moving the fish and said spit to cause said spit to enter the gill openings of the fish by its free end and force a portion of the gills out of the fish, gill removing means operatively associated with said spit, and driving means associated with said gill removing means and said spit for relatively moving said gill removing means and said spit to cause said gill removing means to catch the gills near to the spit and at a point behind the free end of the spit and to move said spit and said gill removing means apart to pull the gills out of the fish supported by said spit, said gill removing means comprising a pincher provided with pinching legs having pinching edges curved into conformity with the curvature of the branchial arches of the fish, said driving means being adapted to move said pincher legs near to and past the longitudinal edges of said flanges substantially longitudinally of said edges.

16. In a fish dressing machine, a spit having a free end, means for relatively moving the fish and said spit to cause said spit to enter the gill openings of the fish by its free end and force a portion of the gills out of the fish, gill removing means operatively associated with said spit, and driving means associated with said gill removing means and said spit for relatively moving said gill removing means and said spit to cause said gill removing means to catch the gills near to the spit and at a point behind the free end of the spit and to move said spit and said gill removing means apart to pull the gills out of the fish supported by said spit, said gill removing means comprising a pair of pincher legs adapted to move in a circular path and having very crooked narrow and oppositely disposed pinching edges and walls behind said edges for preventing entrails from being suspended to said legs when said legs are moved apart.

17. In a fish dressing machine, a spit having a free end, a pocket adapted to receive the fish, means for relatively moving said pocket and said spit to cause said spit to enter the gill openings of the fish by its free end and force a portion of the gills out of the fish, gill removing means operatively associated with said spit, driving means associated with said gill removing means and said spit for relatively moving said gill removing means and said spit to cause said gill removing means to catch the gills near to the spit at a point behind the free end of the spit and to move said spit and said gill removing means apart to pull the gills out of the fish supported by said spit, and means for adjusting the fish transversely to the bottom of the fish pocket to position the gill openings opposite to said free end of the spit.

18. In a fish dressing machine, a spit having a free end, a pocket adapted to receive the fish, means for relatively moving said pocket and said spit to cause said spit to enter the gill openings of the fish by its free end and force a portion of the gills out of the fish, gill removing means operatively associated with said spit, driving means associated with said gill removing means and said spit for relatively moving said gill removing means and said spit to cause said gill removing means to catch the gills near to the spit at a point behind the free end of the spit and to move said spit and said gill removings means apart to pull the gills out of the fish supported by said spit, and means for adjusting the fish transversely to the bottom of the fish pocket to position the gill openings opposite to said free end of the spit, said adjusting means comprising a guide extending along the path of travel of the fish, said conveyor being adapted to move the fish to engage said guide at the back of their heads to cause the fish to be forced down into said pocket.

19. In a fish dressing machine, a spit having a free end, a pocket adapted to receive the fish, means for relatively moving said pocket and said spit to cause said spit to enter the gill openings of the fish by its free end and force a portion of the gills out of the fish, gill removing means operatively associated with said spit, driving means associated with said gill removing means and said spit for relatively moving said gill removing means and said spit to cause said gill removing means to catch the gills near to the spit at a point behind the free end of the spit and to move said spit and said gill removing means apart to pull the gills out of the fish supported by said spit, and means for adjusting the fish transversely to the bottom of the fish pocket to position the gill openings opposite to said free end of the spit, said adjusting means comprising an abutment and also a yielding member adapted to support the bellies of the advancing fish to force the backs of the fish heads against said abutment.

PAUL DANIELSSON.

REFERENCES CITED

The following references are of record in the file of this patent:

UNITED STATES PATENTS

| Number | Name | Date |
|---|---|---|
| 1,926,417 | Youman | Sept. 12, 1933 |
| 2,208,644 | Rue | July 23, 1940 |
| 2,245,329 | Danielsson | June 10, 1941 |